United States Patent
Lorca Hernando

(10) Patent No.: US 9,693,326 B2
(45) Date of Patent: Jun. 27, 2017

(54) METHOD FOR PROVIDING PHASE SYNCHRONIZATION TO NON-PHASE SYNCHRONIZED CELLULAR BASE STATIONS

(71) Applicant: TELEFONICA, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 131 days.

(21) Appl. No.: 14/436,655

(22) PCT Filed: Oct. 4, 2013

(86) PCT No.: PCT/EP2013/070721
§ 371 (c)(1),
(2) Date: Apr. 17, 2015

(87) PCT Pub. No.: WO2014/060225
PCT Pub. Date: Apr. 24, 2014

(65) Prior Publication Data
US 2015/0245308 A1    Aug. 27, 2015

(30) Foreign Application Priority Data

Oct. 17, 2012   (ES) .................................. 201231594

(51) Int. Cl.
  *H04W 56/00* (2009.01)
  *H04J 11/00* (2006.01)
  *H04L 5/00* (2006.01)

(52) U.S. Cl.
  CPC ..... *H04W 56/0015* (2013.01); *H04J 11/0073* (2013.01); *H04J 11/0076* (2013.01);
  (Continued)

(58) Field of Classification Search
  CPC ......... H04W 56/0015; H04W 56/0035; H04W 56/001; H04J 11/0073; H04J 11/0076; H04J 2011/0096; H04L 5/0007; H04L 7/02
  See application file for complete search history.

(56) References Cited

U.S. PATENT DOCUMENTS 5,784,368 A * 7/1998 Weigand ................ H04B 7/269
                                                    370/350
6,643,281 B1 * 11/2003 Ryan .................... H04B 7/2668
                                                    370/208
(Continued)

FOREIGN PATENT DOCUMENTS

| EP | 0 940 942 A2 | 9/1999 |
| EP | 2 299 761 A1 | 3/2011 |
| GB | 2 293 526 A  | 3/1996 |

OTHER PUBLICATIONS

3rd Generation Partnership Project; TS 36.211; Sep. 2012; 3GPP; R11; sections 6.11.1 and 6.11.2.*
(Continued)

*Primary Examiner* — Gary Mui
*Assistant Examiner* — Stephen Steiner
(74) *Attorney, Agent, or Firm* — Sughrue Mion, PLLC

(57) ABSTRACT

The method comprising at least one phase synchronized cellular base station having at least one transmit antenna for transmitting a signal to a at least one non-phase synchronized cellular base station, where it comprises transmitting by said at least one transmit antenna of said phased-synchronized cellular base station a beacon signal to said at least one non-phase synchronized cellular base station, included as part of said transmitted signal, said beacon signal comprising two orthogonal length-8 Walsh-Hadamard sequences
(Continued)

to be broadcasted by said at least one phase synchronized cellular base station in order to provide said phase synchronization.

10 Claims, 6 Drawing Sheets

(52) U.S. Cl.
CPC ....... *H04L 5/0007* (2013.01); *H04W 56/0035* (2013.01); *H04J 2011/0096* (2013.01)

(56) References Cited

U.S. PATENT DOCUMENTS

| | | | | |
|---|---|---|---|---|
| 2009/0135804 | A1* | 5/2009 | Swarts | H04W 56/0085 370/350 |
| 2011/0170527 | A1 | 7/2011 | Yamamoto et al. | |
| 2011/0223903 | A1 | 9/2011 | Michel et al. | |
| 2011/0235555 | A1* | 9/2011 | Zhang | H04L 5/0007 370/280 |
| 2011/0275370 | A1 | 11/2011 | Skov et al. | |
| 2011/0310878 | A1* | 12/2011 | Lindoff | H04J 11/005 370/343 |
| 2013/0122917 | A1* | 5/2013 | Yavuz | H04J 3/0638 455/450 |
| 2015/0173033 | A1* | 6/2015 | Wu | H04W 56/0015 370/328 |

OTHER PUBLICATIONS

International Search Report for PCT/EP2013/070721 dated Dec. 4, 2013 [PCT/ISA/210].
Written Opinion for PCT/EP2013/070721 dated Dec. 4, 2013 [PCT/ISA/237].

* cited by examiner

METHOD FOR PROVIDING PHASE SYNCHRONIZATION TO NON-PHASE SYNCHRONIZED CELLULAR BASE STATIONS

CROSS REFERENCE TO RELATED APPLICATIONS

This application is a National Stage of International Application No. PCT/EP2013/070721, filed on Oct. 4, 2013, which claims priority from European Patent Application No. P201231594, filed on Oct. 17, 2012, the contents of all of which are incorporated herein by reference in their entirety.

FIELD OF THE ART

The present invention generally relates, to a method for providing phase synchronization to non-phase synchronized cellular base stations, and more particularly to a method to provide a new physical signal for LTE-Advanced for transmission by the base stations, aimed at helping small cells in acquiring phase synchronization even in low coverage conditions.

PRIOR STATE OF THE ART

Long-Term Evolution (LTE) is the next step in cellular 3G systems, which represents basically an evolution of present mobile communications standards, such as UMTS and GSM [1]. It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth.

LTE-Advanced (LTE-A), an evolution of LTE, is being standardized in LTE Release 10 and beyond. It is aimed at fulfilling IMT-Advanced requirements, whose capabilities go beyond those of IMT-2000 and include enhanced peak data rates to support advanced services and applications (100 Mbps for high mobility, and 1 Gbps for low mobility).

Some of the most advanced functionalities devised for LTE-Advanced require tight synchronization between the relevant base stations (known as eNodeBs in LTE terminology), covering the categories of frequency synchronization, phase synchronization and time synchronization.

The purpose of synchronization in the context of a communications network is to make sure that the relevant nodes possess a common frequency, time and phase reference for data transmission. Synchronization is not always needed at all levels, e.g. only frequency synchronization is mandatory for Release-8 eNodeBs, there not being any requirement for phase and time synchronization. However, some of the most relevant LTE-Advanced functionalities rely upon tight phase and time synchronization and are especially applicable when dealing with LTE heterogeneous networks (HetNets), comprising a mixture of macro cells and small cells at the same or different frequencies. Interference issues between macro cells and small cells can be partially alleviated through solutions involving cooperation of the relevant nodes, and most of these solutions assume a common time and phase reference.

Frequency synchronization involves the distribution of a common frequency reference to the relevant nodes for tuning of the local oscillators. Phase synchronization (also known as relative-time synchronization) implies that all the nodes have access to the same timing signal, thereby resulting in rising edges occurring at the same times. Time synchronization involves the distribution of a common universal time-base, such as Coordinated Universal Time (UTC).

There is a 3GPP requirement on the maximum absolute frequency error for eNodeBs of different characteristics (wide area, local area or home eNB), applicable since LTE Release 8 [2]. However no time or phase synchronization requirements are additionally imposed and coordination between eNBs is only achieved through messages exchange with the aid of X2 interface. With the advent of LTE-Advanced and features such as Coordinated Multi-Point (COMP) [3], Almost Blank Subframes (ABS) and other enhanced Inter-Cell Interference Coordination techniques (eICIC) [8], additional phase and time synchronization has to be assumed for correct operation.

Problems with Existing Solutions

Time and phase synchronization can be achieved with the use of specific techniques, such as Global Positioning System (GPS), time-division multiplex (TDM) (Synchronous Digital Hierarchy -SDH- or Plesiochronous Digital Hierarchy -PDH-), Synchronous Ethernet (SyncE), IEEE 1588v2 and Network Time Protocol (NTP), among others. Some of these technologies require significant network upgrades to support the relevant protocols, and their use in some types of backhaul links (such as DSL or cable) may not be reliable due to unpredictable large delays [7]. The use of Global Positioning Systems (GPS) depends upon the availability of satellite vision, which is not a feasible option in indoor situations.

Small cell deployments can be tackled in a planned or unplanned fashion. Planned small cell deployments are performed over specific locations (hot spots, airports, public venues, and so on) carefully selected by the operator, and usually comprise a collection of micro/pico eNBs with their appropriate backhaul links. Unplanned small cell deployments include so-called femto cells (or Home-eNodeBs in 3GPP terminology), which represent low-cost small base stations installed by the users at locations unknown to the operator, and for which the customer premises' xDSL or fiber links are exploited as backhaul. While micro/pico cells can be carefully deployed and installed together with the required backhaul, indoor residential femto cells cannot usually comply with time and phase synchronization requirements due to latency uncertainties in xDSL lines [7]. For this case the use of GPS is also precluded as no satellite vision is possible.

Other solutions have also been proposed. For instance, the solution proposed in patent application US 2011/0275370 which involves a complex discovery process whereby uncoordinated nodes establish an association process with other coordinated nodes, with the use of specific identification signals. This has the drawback of requiring complex interaction between nodes and introducing new signals, which might not be backwards-compatible with existing legacy network nodes and terminals; moreover, the listening procedure provided for the uncoordinated nodes requires a good communication link between them and the coordinated ones, therefore precluding its use in bad coverage conditions. Other solutions US 2011/0170527 also rely upon good signal coverage between nodes, in order to correct eventual frequency offsets between them, and possibly making use of primary/secondary synchronization signals US 2011/

0223903. The use of these signals is only fruitful if the received signal to noise ratio (SNR) is above a certain limit, which is not always the case for unplanned femto cells. GB2293526 refers to a method for providing phase synchronization to non-phase synchronized cellular base stations that does not disclose how to build the beacon signal to transmit the phase reference to the non-synchronized base stations. Further, EP0940942 discloses a method for transmitting synchronization information using a Hadamard code pattern between a base station and remote stations, and not a synchronization method between base stations.

Additional techniques are therefore required for achieving low-cost synchronization solutions for situations where significant network and backhaul upgrades are not possible and reception of LTE primary and secondary synchronization signals is much degraded.

SUMMARY OF THE INVENTION

The object of the present invention is to provide a new physical signal for LTE-Advanced for transmission by the eNodeBs, aimed at helping small cells in acquiring phase synchronization even in low coverage conditions, and with no impact on legacy terminals and eNodeBs not implementing the proposed invention. Air interface synchronization avoids the need to carry specific synchronization signals and protocols over multiple network nodes (from a master clock reference towards the relevant eNodeBs), as well as implement suitable synchronization protocols in the transport network.

To that end, the present invention relates, to a method for providing phase synchronization to non-phase synchronized cellular base stations, comprising at least one phase synchronized cellular base station having at least one transmit antenna for transmitting a signal to at least one non-phase synchronized cellular base station.

On contrary to the known proposals, the method in a characteristic manner comprises transmitting by said phased-synchronized cellular base station a beacon signal to said at least one non-phase synchronized cellular base station, included as part of said transmitted signal, said beacon signal comprising two orthogonal length-8 Walsh-Hadamard sequences to be broadcasted by said at least one phase synchronized cellular base station in order to provide said phase synchronization.

The Synchronization beacon signal proposed in this invention is aimed at acquiring over-the-air subframe, slot and symbol reference by unsynchronized cells. The structure of the proposed beacon signal does not impact legacy LTE resource element mapping, as it makes use of unused REs located above and below the PSS and SSS. These REs are characterized by having virtually no interference from other cells if the network is supposed to be fully time-synchronized, therefore suffering only from thermal and atmospheric noise, which results in increased coverage. Macro cells with a stable time/phase reference can broadcast the beacon signal so that small cells with suitable downlink receivers can detect it and obtain accurate symbol, slot and subframe references.

In an embodiment, the method maps the two orthogonal length-8 Walsh-Hadamard sequences of the beacon signal periodically every 10 milliseconds (ms) on unused Resource Elements of type 1 or type 2 LTE frame structure, inside the slots and symbols where Primary and Secondary Synchronization Signals are transmitted.

For the case of LTE frame structure type 1 the mapping of the orthogonal length-8 Walsh-Hadamard sequences on said unused Resource Elements is performed by using the following expressions:

$$\text{sequence } 1 \begin{cases} \text{1st half on slot } 0, l = N_{sym}^{DL} - 2, m = -n - 31 + \frac{N_{RB}^{DL} N_{sc}^{RB}}{2} \\ \text{2nd half on slot } 0, l = N_{sym}^{DL} - 1, m = -n - 31 + \frac{N_{RB}^{DL} N_{sc}^{RB}}{2} \end{cases}$$

$$\text{sequence } 2 \begin{cases} \text{1st half on slot } 0, l = N_{sym}^{DL} - 2, m = n + 31 + \frac{N_{RB}^{DL} N_{sc}^{RB}}{2} \\ \text{2nd half on slot } 0, l = N_{sym}^{DL} - 1, m = n + 31 + \frac{N_{RB}^{DL} N_{sc}^{RB}}{2} \end{cases}$$

where l is the symbol number and m the resource element number, $N_{sym}^{DL}$ denotes the number of symbols in each slot, $N_{RB}^{DL}$ is the system bandwidth expressed as a number of resource blocks, $N_{sc}^{RB}$ is the number of subcarriers in each resource block, and n can take the values 2, 3, 4 and 5.

On the other hand, for the case of LTE frame structure type 2 the mapping is performed by using the following expressions:

$$\text{sequence } 1 \begin{cases} \text{1st half on slot } 1, l = N_{sym}^{DL} - 1, m = -n - 31 + \frac{N_{RB}^{DL} N_{sc}^{RB}}{2} \\ \text{2nd half on slot } 2, l = 2, m = -n - 31 + \frac{N_{RB}^{DL} N_{sc}^{RB}}{2} \end{cases}$$

$$\text{sequence } 2 \begin{cases} \text{1st half on slot } 1, l = N_{sym}^{DL} - 1, m = n + 31 + \frac{N_{RB}^{DL} N_{sc}^{RB}}{2} \\ \text{2nd half on slot } 2, l = 2, m = n + 31 + \frac{N_{RB}^{DL} N_{sc}^{RB}}{2} \end{cases}$$

The beacon signal is modulated by a Binary phase-shift keying (BPSK) modulation in order to enhance detection.

In case the phase synchronized cellular base station has a plurality of transmit antennas a synchronized beacon beamforming can optionally be applied over said unused Resource Elements. In this case, phase shifts and amplitudes on the signals feeding said plurality of transmit antennas are applied.

The beacon signal is transmitted on the same antenna ports of said plurality of transmit antennas used for said Primary and Secondary Synchronization Signals.

Finally, the non-phase synchronized cellular base station is a small cell base station, and the phase synchronized cellular base station can be either a macro cell base station or a small cell base station.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

The proposed invention deals with the problem of providing a common phase reference between several eNodeBs in a LTE-Advanced heterogeneous network (HetNet), such network comprising a mixture of macro cells and small cells where tight time, phase and frequency synchronization is required. In particular, embodiments of this invention proposes a mechanism whereby a small cell can acquire the required phase reference from an already phase-synchronized cell (usually a macro cell) in interference-limited scenarios, such as those encountered at coverage holes in HetNets, without upgrading any backhaul links or network nodes for the support of additional synchronization protocols.

Small cells with good coverage from the macro cell could employ the Primary/Secondary Synchronization Signals (PSS/SSS) for over-the-air synchronization purposes. However, at coverage holes these signals can no longer be useful due to heavy interference from other cells, as may happen at the cell boundaries between two or more cells.

The proposed invention introduces an air-interface synchronization method that avoids performing any backhaul upgrades and that can be operated in interference-limited scenarios and/or indoor situations, where a satellite signal is not available for GPS receivers. In what follows the term "synchronized" will be considered equivalent to "phase synchronized" for the purpose of obtaining suitable subframe, slot, and symbol references.

Figure 1:
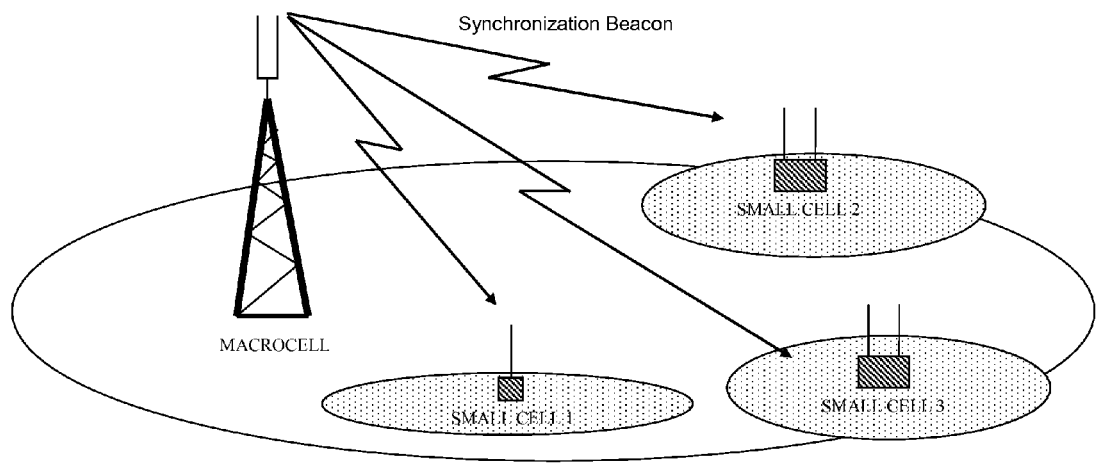
FIG. 1 is an illustration of the proposed scenario for the proposed invention, comprising one or more synchronized macro cells and one or more unsynchronized small cells.

The scenario for the proposed invention is shown in FIG. 1, comprising one or more synchronized macro cells and one or more unsynchronized small cells.

The proposed invention introduces a new signal which will be denoted as "Synchronization Beacon", to be broadcast by those cells having precise phase reference (irrespective of their cell sizes, although in the figure it is depicted the case of a macro cell). The proposed Synchronization Beacon has the property of not compromising normal LTE operation, and legacy UEs and eNBs will not be interfered by it. In FIG. 1 the macro cell transmits the proposed Synchronization Beacon so that the different unsynchronized small cells may acquire a precise phase reference from it even in the presence of severe interference.

Time-Division Duplex (TDD) small cells will be able to detect the Synchronization Beacon without any modifications on their radio frequency front ends, but Frequency-Division Duplex (FDD) small cells should incorporate an additional receiver (operating at the downlink frequency) for suitable reception of the proposed beacon. This receiver may also be included for other operation and maintenance (OAM) tasks, such as air interface scanning at power on or auto-configuration features, and therefore it could be reused for the purposes of the present invention.

Figure 2:
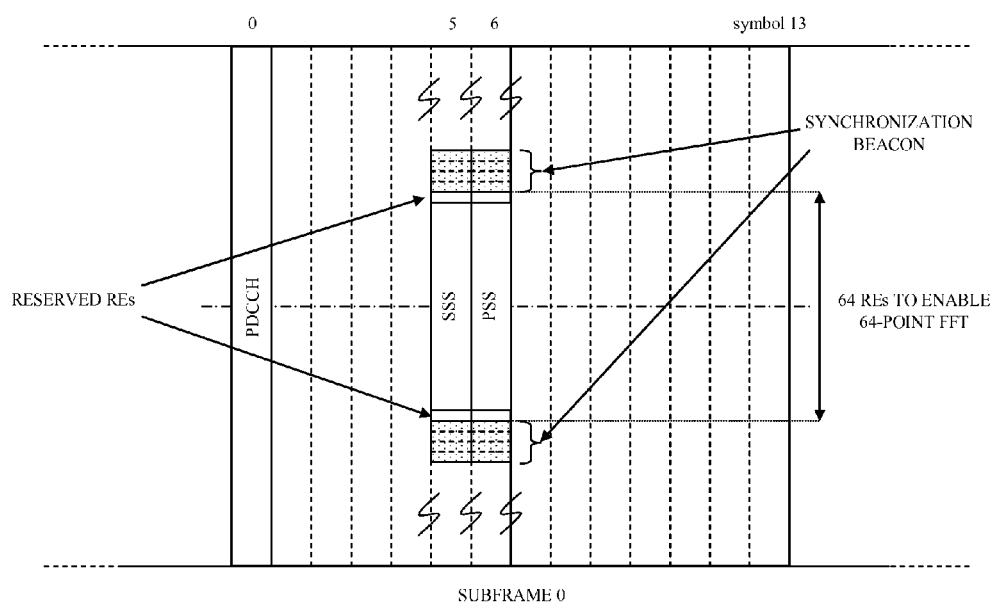
FIG. 2 is an illustration of the resource mapping for the proposed Synchronization Beacon in the particular case of an FDD network with normal cyclic prefix.

The Synchronization Beacon is designed in a way that no cell identification is carried by it, contrary to the Primary Synchronization Signal -PSS- and Secondary Synchronization Signal -SSS- wherein the cell's Physical Cell Identity (PCI) is implicitly included. The proposed beacon comprises two orthogonal sequences modulated on four resource elements, the ones located at the top and the bottom of the resource blocks usually reserved for PSS/SSS, and is aimed at providing suitable subframe and slot reference to an unsynchronized cell. This beacon shall be transmitted with a periodicity of 10 ms inside symbols 5 and 6 of subframe 0. FIG. 2 illustrates the resource mapping for the proposed Synchronization Beacon in the particular case of an FDD network with normal cyclic prefix.

The six central Resource Blocks (RBs) comprise 72 Resource Elements (REs), 62 of which contain the PSS/SSS sequence. User Equipment's (UEs) can perform a 64-point DFT in order to decode the central region, and the remaining 10 REs (five above and below) are reserved and not used in LTE [5]. This invention proposes to reserve only a single RE above and below the PSS/SSS, thus aiding in the 64-DFT operation, and exploit the four remaining REs for carrying an orthogonal length-8 sequence. Two such sequences are thus defined above and below the PSS and SSS channels.

Although the Primary and Secondary Synchronization Signals might be used as a suitable time and frequency reference, small cells can be deployed at coverage holes where the received signal to interference and noise ratio (SINR) may be too low for usual synchronization procedures to be effective. Moreover, PSS/SSS transmissions from multiple macro cells will naturally collide at the 62 central resource elements reserved for them [4], and the small cell's receiver might not be able to discriminate them in heavy interference scenarios, especially for the SSS (where a total of 168 possible sequences are to be decoded). This is even more problematic in a time-synchronized network, where PSS/SSS transmissions from multiple cells will certainly collide at the same time instants and REs.

The main advantage of the proposed Synchronization Beacon is that, assuming time-synchronized macro cell transmissions, no interference from other cells would be present at the proposed REs, therefore improving detection by unsynchronized small cells. Moreover, the static nature of the channel as seen by the small cell makes it possible to achieve synchronization even in very low coverage conditions.

If the synchronized cells make use of multiple antennas, it could also be possible to enhance coverage by applying "Synchronized Beacon beamforming" over the REs reserved for the Synchronization Beacon. Synchronized Beacon beamforming involves beam steering of only the REs reserved for the beacon, with the use of multiple transmit antennas. This feature would not affect legacy terminals as it should only be applied on otherwise reserved REs. The Synchronization Beacon's beam would be changed on a 10 ms basis (the periodicity of the proposed beacon) so as to maximize the probability of detection by small cells located at coverage holes or cell edges.

Structure of the Synchronization Beacon:

The proposed Synchronization Beacon comprises two different bipolar Walsh-Hadamard length-8 sequences. These sequences possess the property of being orthogonal (i.e. their cross-correlation is zero) when perfectly aligned, while at the same time being very simple to decode. As no more than one orthogonal sequence will be transmitted at a time on the REs reserved for it, there will be no inter-sequence interference thus aiding in the detection process.

A total of eight orthogonal Walsh-Hadamard sequences of length 8 can be constructed, of which only two are required for the present invention and can be picked from the list in Table 1.

TABLE 1

Possible length-8 Walsh-Hadamard bipolar sequences
Length-8 Walsh-Hadamard sequences 1, 1, 1, 1, 1, 1, 1, 1
1, 1, 1, 1, −1, −1, −1, −1
1, 1, −1, −1, 1, 1, −1, −1
1, 1, −1, −1, −1, −1, 1, 1
1, −1, 1, −1, 1, −1, 1, −1
1, −1, 1, −1, −1, 1, −1, 1
1, −1, −1, 1, 1, −1, −1, 1
1, −1, −1, 1, −1, 1, 1, −1

Any two sequences taken from the table are equally valid as all of them are orthogonal. One possible choice is shown in Table 2, but any other combination is equally valid for the purpose of the present invention.

TABLE 2

Bipolar sequence definition of the Synchronization Beacon

| Sequence number | Sequence definition |
| --- | --- |
| 1 | 1, 1, 1, 1, −1, −1, −1, −1 |
| 2 | 1, 1, −1, −1, −1, −1, 1, 1 |

The mapping of these sequences on slots and resource elements RE(l, m), where l is the symbol number and m the resource element number, shall be as follows.

For Frame Structure Type 1 (FDD):

$$\text{sequence 1} \begin{cases} \text{1st half on slot 0}, l = N_{sym}^{DL} - 2, m = -n - 31 + \frac{N_{RB}^{DL} N_{sc}^{RB}}{2} \\ \text{2nd half on slot 0}, l = N_{sym}^{DL} - 1, m = -n - 31 + \frac{N_{RB}^{DL} N_{sc}^{RB}}{2} \end{cases}$$

$$\text{sequence 2} \begin{cases} \text{1st half on slot 0}, l = N_{sym}^{DL} - 2, m = n + 31 + \frac{N_{RB}^{DL} N_{sc}^{RB}}{2} \\ \text{2nd half on slot 0}, l = N_{sym}^{DL} - 1, m = n + 31 + \frac{N_{RB}^{DL} N_{sc}^{RB}}{2} \end{cases},$$

where $N_{sym}^{DL}$ denotes the number of symbols in each slot, $N_{RB}^{DL}$ is the system bandwidth expressed as a number of resource blocks, $N_{sc}^{RB}$ is the number of subcarriers in each resource block, and n can take the values 2, 3, 4 and 5.

For Frame Structure Type 2 (TDD):

$$\text{sequence 1} \begin{cases} \text{1st half on slot 1}, l = N_{sym}^{DL} - 1, m = -n - 31 + \frac{N_{RB}^{DL} N_{sc}^{RB}}{2} \\ \text{2nd half on slot 2}, l = 2, m = -n - 31 + \frac{N_{RB}^{DL} N_{sc}^{RB}}{2} \end{cases}$$

$$\text{sequence 2} \begin{cases} \text{1st half on slot 1}, l = N_{sym}^{DL} - 1, m = n + 31 + \frac{N_{RB}^{DL} N_{sc}^{RB}}{2} \\ \text{2nd half on slot 2}, l = 2, m = n + 31 + \frac{N_{RB}^{DL} N_{sc}^{RB}}{2} \end{cases}.$$

Each sequence is split into two length-4 half-sequences that are mapped on the symbols corresponding to the PSS and SSS, on the REs above and below those carrying the synchronization signals, after leaving an additional RE for detection. The mapping should be done in increasing order of m, that is, the sequence elements in Table 2 shall be mapped from left to right to REs with increasing subcarrier frequency indices.

Figure 3:
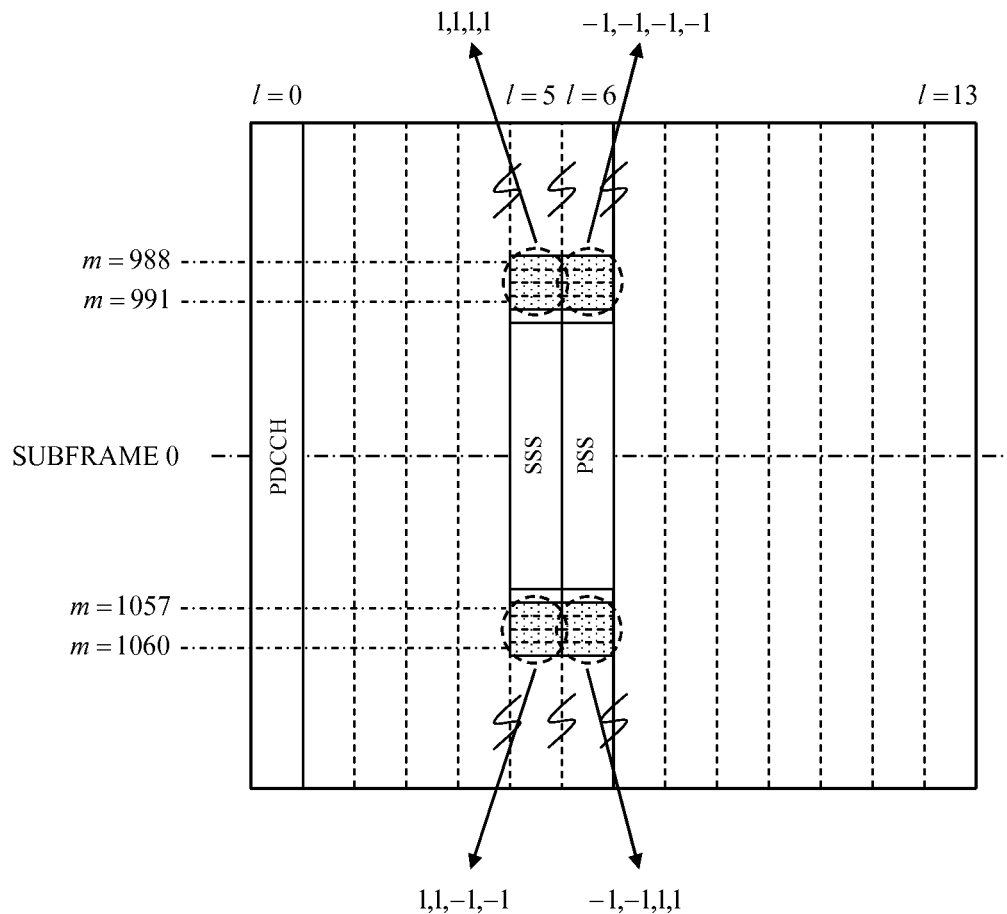
FIG. 3 is an illustration of the proposed Resource Elements (REs) for the particular case of frame structure type 1 and normal cyclic prefix.

For illustrative purposes, FIG. 3 depicts the proposed REs for the particular case of frame structure type 1 and normal cyclic prefix. In the figure it is shown the combination of sequences of Table 2, but any other combination would be equally valid for the purpose of the invention. The mapping for the cases of extended cyclic prefix or frame structure type 2 (TDD) is very similar and shall follow the rules expressed in the above equations.

Figure 4:
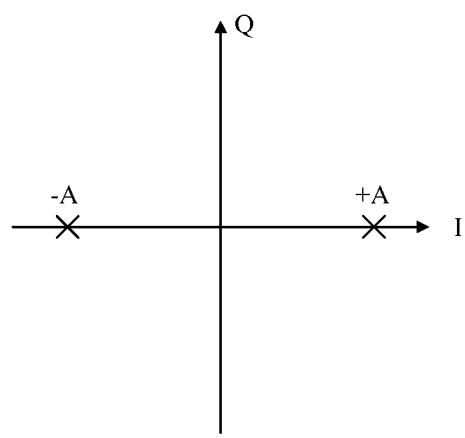
FIG. 4 is a constellation depicting the modulation type for the beacon in order to enhance detection.

The beacon shall be modulated in BPSK for enhanced detection thanks to a higher inter-symbol distance, as shown in the constellation depicted in FIG. 4. The value of "A" corresponds to the actual magnitude of the modulated symbols and should be derived by the eNodeB according to the total transmission power.

In the case of multiple transmit antennas being used at the eNodeB, the proposed synchronization beacon shall be transmitted on the same antenna port as that used for the PSS and SSS. If time-switch antenna diversity is used for PSS/SSS, it shall also be used for the proposed beacon [4].

The two REs located just above and below the PSS/SSS should be reserved and not used, in order to aid in the normal detection of PSS and SSS by UEs. Terminals and small cells not implementing the proposed invention would not be aware of it as only reserved REs are used for the proposed beacon; hence no impact would be caused over the rest of the network.

Synchronized Beacon's Beamforming in Multi-Antenna eNodeBs:

If the macro cells have multiple transmit antennas the chances for correct detection by the small cells can be increased. The coverage of the Synchronization Beacon can be enhanced by so-called "classical" beamforming techniques, by which the transmit beam is electronically steered towards different directions in space by applying suitable phase shifts and amplitudes on the signals feeding the available transmit antennas. These shall be applied only on the REs reserved for the Synchronization Beacon, not affecting normal operation on the other REs. An embodiment of this concept is illustrated in FIG. 5.

Figure 5:
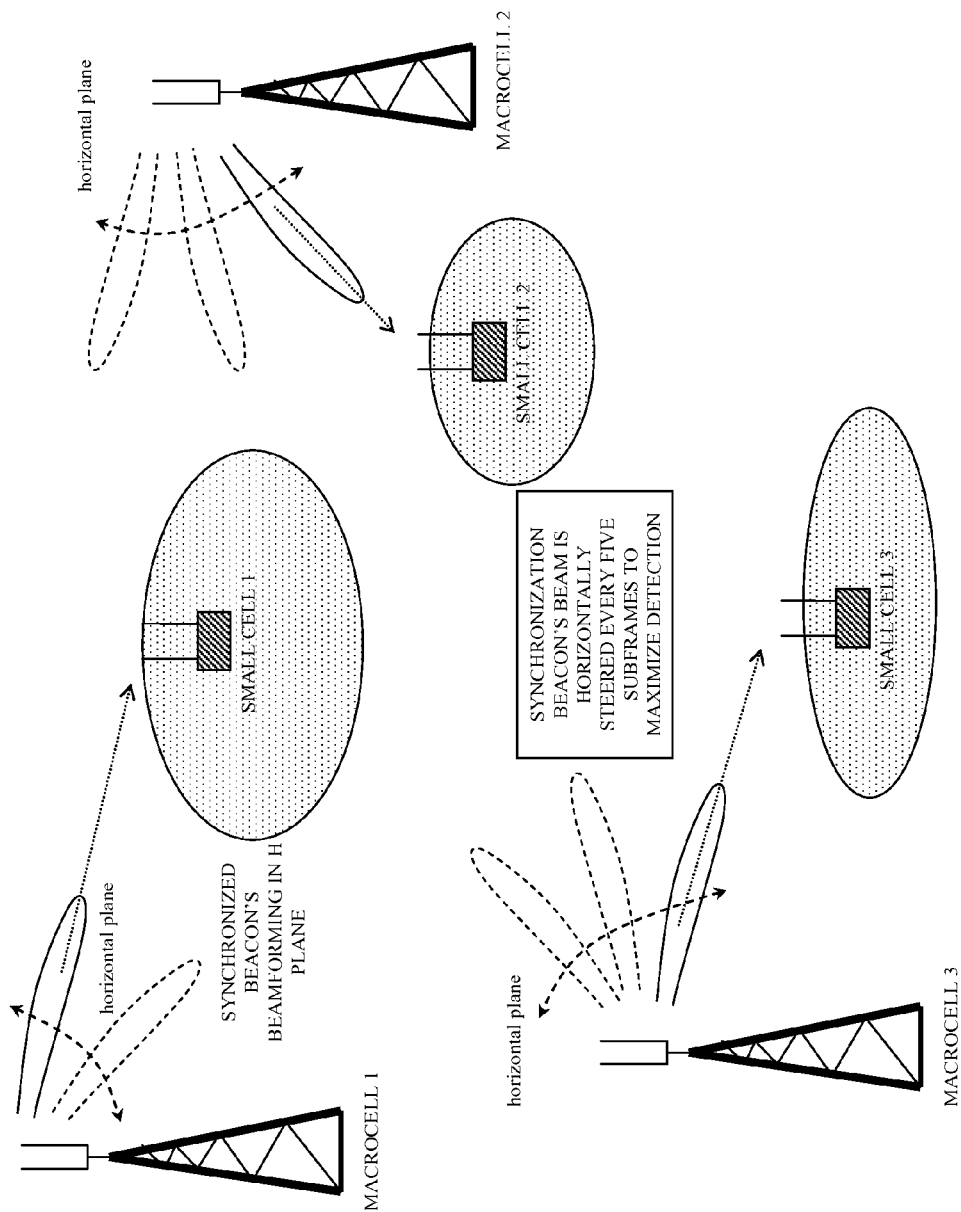
FIG. 5 is an illustration showing the concept of the Synchronized Beacon's beamforming in multi-antenna eNodeBs.

In FIG. 5, different macro cells apply horizontal beamforming only on the REs reserved for the proposed Synchronization Beacon. Beamforming is applied in a synchronized way, so that the beam's orientation is changed every ten subframes (10 ms) with the aid of multiple TX antennas, by applying suitable phase shifts and/or amplitudes over the signals mapped on the 16 REs reserved for the Synchronization Beacon. Beam steering should be done in a cyclic way, therefore helping to improve detection by small cells located at the cell edges. As the beacon's beam is cyclically steered, there is higher chance for detection even at the cell edges.

Legacy small cells and terminals not implementing the proposed invention would not be affected as they should discard the reserved REs above and below the PSS/SSS.

Non-Coherent Detection of the Synchronization Beacon:

The proposed Synchronization Beacon is intended to be detected by the small cells to be synchronized, with the aid of a suitable downlink receiver, in situations where the received SINR is so poor that PSS/SSS-based synchronization methods are not useful.

The beacon can be detected by a non-coherent detection technique, as the channel transfer function is unknown prior to synchronization, but any other detection method can be considered valid for the purpose of the present invention.

Under the assumption that the channel is non-frequency selective, maximum likelihood (ML) non-coherent detection involves finding the timing offset for which the following expression is maximized [4]:

$$\hat{k} = \mathrm{argmax}\left\{\left|\sum_{i=0}^{7} S[i]q[i]\right|\right\}.$$

In this expression S[i] represents the signal contained in the REs to be analyzed, q[i] is the expected pattern, and $\bar{k}$ is the estimated time offset for which synchronization is fulfilled. The sum covers the eight terms containing the whole length-8 sequence, which is split into two half-sequences according to the proposed RE mapping: one half for the OFDM symbol containing the PSS and the other to the symbol containing the SSS. It is to note that the expected synchronization beacon is a pure real signal, hence the absence of any conjugation operation in the above sum.

The above correlation should be applied separately for the REs located above and below the centre frequency $$\frac{N_{RB}^{DL} N_{sc}^{RB}}{2}.$$

This is because the channel transfer function cannot be assumed to be constant on the positive and negative parts of the spectrum; hence the summation should be performed separately over both parts of the spectrum. However it should be possible to enhance correlation by adding terms on a 10 ms basis, as the channel will not change on average between successive synchronization beacons.

Given the small bandwidth occupied by each half-sequence (four REs in each OFDM symbol, equivalent to 60 kHz), it is reasonable to assume that it will be much lower than the coherence bandwidth of the channel. The 90% and 50% coherence bandwidths are given by [4] [4]

$$B_{c,90\%} = \frac{1}{50\sigma_\tau},$$

$$B_{c,50\%} = \frac{1}{5\sigma_\tau},$$

where $\sigma_\tau$ is the r.m.s. delay spread of the channel. In [9] [9] the maximum r.m.s. delay spread considered is 991 ns, corresponding to a 90% coherence bandwidth of 20 kHz and a 50% coherence bandwidth of 200 kHz. The channel transfer function can thus be considered reasonably constant over the 60 kHz bandwidth containing the beacon, and non-coherent detection techniques are suitable.

In addition to this, as the small cell will by definition be in a static location, the channel characteristics will be constant in time (apart from random fluctuations caused by the objects in the environment). These characteristics can be exploited by small cells' receivers in order to enhance detection.

Figure 6:
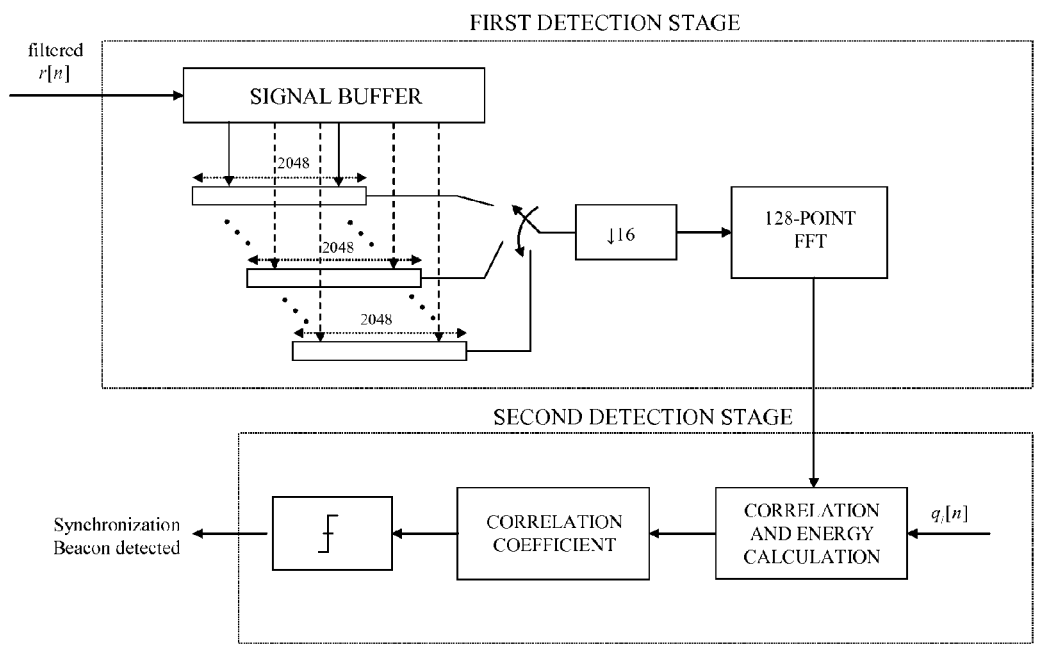
FIG. 6 is an illustration showing the two detection stages of the proposed non-coherent beacon detector.

The proposed non-coherent beacon detector comprises two stages as shown in FIG. 6, where for simplicity a symbol length of 2048 samples is assumed (corresponding to a 20 MHz system bandwidth). It will be apparent to those skilled in the art that the proposed scheme can easily be adapted to other system bandwidths, simply changing the length of the symbols and the decimation factor.

The first stage performs 128-point FFTs over shifted versions of the received symbols, after decimation by a factor 16 so that only the 128 central subcarriers (where the synchronization beacon is to be located) are analysed. FFTs with a length that is a power of two can easily be implemented in hardware. The second stage performs correlations of the signals in the REs reserved for the beacon sequence with the expected BPSK sequences, and the maximum correlation coefficient will indicate the time shift for the symbols containing the synchronization beacon.

The signal r[n] should be appropriately filtered prior to the first stage, in order to remove any frequency contents outside the central region where the 128-point FFT operates (1.92 MHz). This should be done in order to prevent aliasing caused by upper frequency content when performing the decimation operation.

In the first stage, after storing a number of baseband digital samples of the received signal in a buffer, a trial-and-error process tries to find the appropriate time shifting for the beginning of the OFDM symbols. To do this, after discarding the cyclic prefix, subsequent decimation by a factor 16 reduces the symbol length to 128 samples. This is equivalent to paying attention only to the central 128 subcarriers (1.92 MHz) where the PSS/SSS synchronization signals, as well as the synchronization beacon, are present. A suitable 128-point FFT can be applied in order to extract the information contained in the REs reserved for the synchronization beacon.

The second stage performs correlations with the expected BPSK Walsh-Hadamard sequences $q_r[n]$. After calculating the correlation coefficient and looking at the time shift for which it is a maximum, it is possible to detect the beginning of symbols 5 and 6 in slot 0 where the beacon sequence is located. The correlation coefficient is defined as the correlation normalized by the square root of the product of the energies associated to the received and expected signal:

$$\rho = \frac{\left|\sum_i S_i q_i\right|}{\sqrt{\sum_i |S_i|^2} \cdot \sqrt{\sum_i q_i^2}}.$$

Normalization by the corresponding energies avoids having different absolute correlation values depending on the channel characteristics (number of multipath components, channel gain, etc.); additionally, in the presence of high interference the correlations could result in high spurious values this making the decision process more unreliable. The correlation coefficient should however be a maximum when synchronization is achieved, irrespective of the absolute magnitudes of the received signals.

Figure 7:
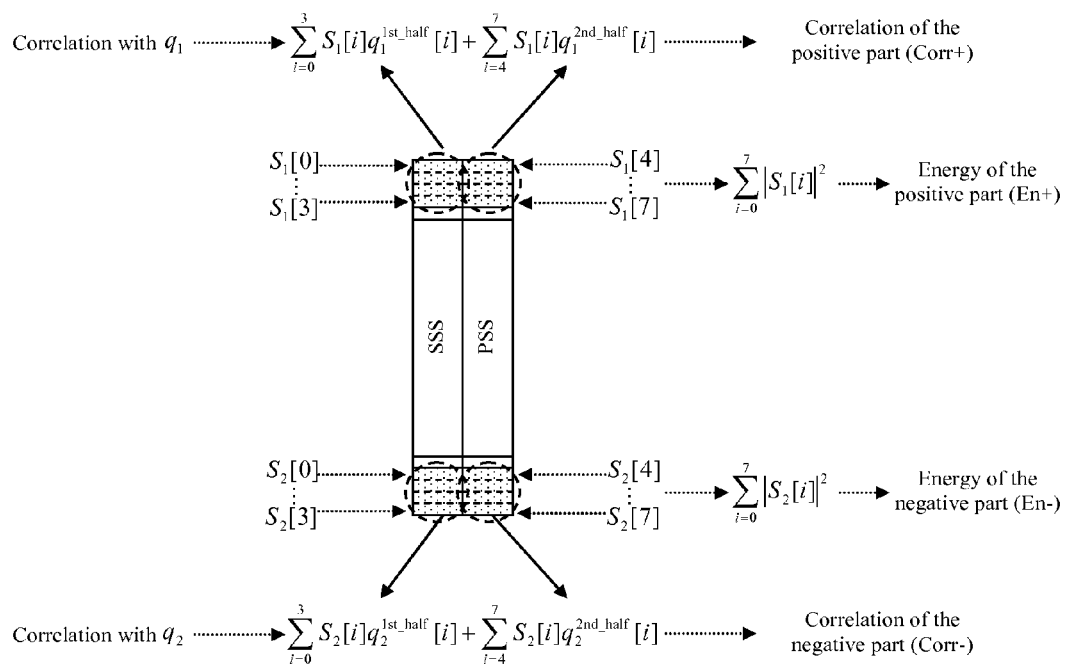
FIG. 7 is an illustration depicting the concept for Non-coherent detection of the Synchronization Beacon for the case of frame structure type 1.

The correlations should be performed separately for the 8 REs located above and below the PSS/SSS, because they are supposed to be affected by different channel transfer functions. FIG. 7 depicts in an embodiment the concept for the case of frame structure type 1. Denoting $S_1[i], S_2[i]$ as the received symbols in the REs located above and below the PSS/SSS, respectively, and $q_1, q_2$ the corresponding bipolar sequences as defined in Table 2, the correlations are performed separately for the positive and negative parts of the spectrum, as well as the energy calculation. This assumes constant channel values in the eight REs involving each beacon sequence, but possibly different channel values at the lower and upper parts of the involved spectrum.

The resulting correlation and energy terms will be the sum of the positive and negative parts (namely Corr$^+$, Corr$^-$ for the correlations, and En$^+$, En$^-$ for the energies, respectively), according to the following relations:

$$\text{Corr}^+ = \sum_{i=0}^{3} S_1[i] q_1^{1st\_half}[i] + \sum_{i=4}^{7} S_1[i] q_1^{2nd\_half}[i]$$

$$\text{Corr}^- = \sum_{i=0}^{3} S_2[i] q_2^{1st\_half}[i] + \sum_{i=4}^{7} S_2[i] q_2^{2nd\_half}[i]$$

$$En^+ = \sum_{i=0}^{7} |S_1[i]|^2$$

$$En^- = \sum_{i=0}^{7} |S_2[i]|^2.$$

The correlation coefficient will thus be given by the expression:

$$\rho = \frac{|\text{Corr}^+| + |\text{Corr}^-|}{\sqrt{8}\left(\sqrt{En^+} + \sqrt{En^-}\right)}.$$

In the above expressions the energy of the expected sequences is a constant value equal to $\sqrt{8}$.

As the channel is essentially constant in time at the small cell's location, correlations and energies can be enhanced by successively time-averaging terms with a periodicity of 10 ms. If synchronized beacon beamforming is used, this would also improve detection at the instants when the beacon's beam is oriented towards the receiver location. Even if time-switched antenna diversity is employed for PSS/SSS transmission at the eNodeB, correlations will be successively improved with time averaging although the channel may eventually change as a result of antenna switching.

Case of Receiving Multiple Copies of the Synchronization Beacon:

The received beacon can contain multiple copies coming from different macro cells, and eventually it could result in a delay spread larger than the length of the cyclic prefix. This would cause inter-symbol interference (ISI) as well as inter-carrier interference (ICI), therefore affecting normal OFDM detection [6] [6].

The impact of this "beacon pollution" over the whole OFDM signal should be very low due to the small energy contained in the synchronization beacon, as it comprises only 16 REs over two OFDM symbols. However, as the REs containing the beacon should only suffer from thermal and atmospheric noise, it is possible that significant interference from distant beacons may distort the beacon signal.

The concept of synchronized beacon beamforming may alleviate this issue. The chance that more than one beacon is received at the same time is minimized if the beams' orientations are cyclically changed, as compared to the case of a static beacon transmission. Other techniques include applying a more aggressive down tilt to reduce interference on adjacent cells, or activate the synchronization beacon only on particular macro cells so as to minimize beacon pollution effects. This invention does not consider any of these implementation aspects.

Figure 8:
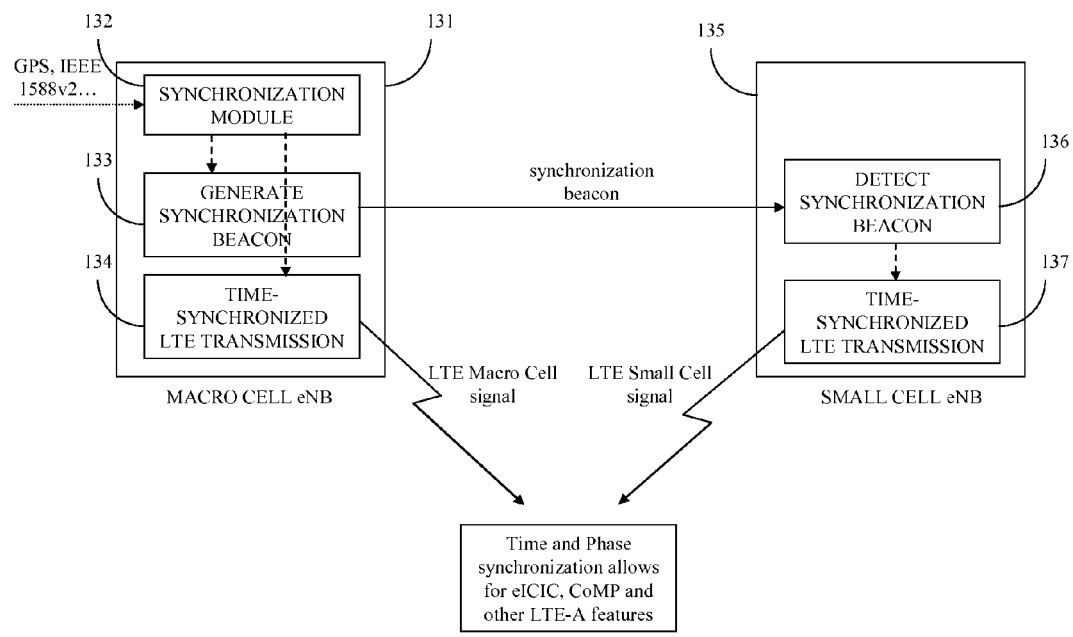
FIG. 8 is an exemplary embodiment of the proposed invention where one or several macro cells are assumed to be time- and phase-synchronized by using any suitable synchronization technique, such as GPS or IEEE 1588v2, and they transmit the proposed Synchronization Beacon in order to provide suitable phase reference to non-synchronized small cells.

FIG. 8 depicts another embodiment of the proposed invention. One or several macro cells (block 131) are assumed to be time- and phase-synchronized by using any suitable synchronization technique, such as GPS or IEEE 1588v2 (block 132). In the context of heterogeneous network deployments, one or more unsynchronized small cells are located at macro cell's coverage holes (block 135). The goal for them is to perform over-the-air phase synchronization so that advanced features such as eICIC or CoMP can be suitably applied.

The synchronized macro cell (block 131) generates the Synchronization Beacon on the REs above and below the synchronization signals PSS/SSS (block 133), and includes it as part of the LTE transmitted signal (block 134). Eventually the macro cell can optionally perform synchronized beamforming of the Synchronization Beacon, in order to enhance coverage as described in section 0. The small cell in block 135 detects the Synchronization Beacon and, with the aid of it, acquires appropriate symbol, slot and subframe references (block 136). The small cell can thus achieve phase synchronization and generate a transmission signal which is coordinated with the one from the macro cell (block 137). This enables the application of LTE-Advanced features such as eICIC, ABS or CoMP techniques.

The proposed invention can be implemented as a collection of software elements, hardware elements, firmware elements or any combination of them.

Advantages of the Invention

The proposed invention introduces a method for achieving over-the-air phase synchronization for small cells located in interference-limited scenarios with poor radio conditions. Time and phase synchronization, in addition to frequency synchronization, are an essential part of many techniques devised for LTE-Advanced. Approaches based upon the use of backhaul synchronization protocols (such as NTP or IEEE 1588v2) are usually complex as they involve modifications of all the nodes in the path from a given reference clock server to the eNodeB, as well as upgrading the backhaul to support such protocols. In addition to that, deployments based on Home eNodeBs are not usually capable of using such synchronization protocols, as the backhaul lines may not comply with the required latency and delay.

The proposed method is intended for situations where a small cell, possibly experiencing poor signal conditions from the macro cell, needs accurate phase reference for synchronizing its transmissions with the macro cell. This is a typical scenario like that in which Home-eNodeBs located at coverage holes are installed by the user in an uncoordinated way. Usual synchronization techniques employing the LTE primary and secondary synchronization signals may not be feasible in this case. This invention introduces a physical beacon signal to be sent every 10 ms over otherwise reserved resource elements located near the PSS/SSS, with a very simple structure designed so as to enhance the probability of detection by static small cells. The proposed synchronization beacon will not affect legacy users and other cells not implementing the proposed invention, as they are sent on previously unused REs.

The use of multiple antennas from the macro cell would also allow for the application of synchronized beamforming aimed at steering the beam associated to the proposed Synchronization Beacon. The steering should be applied in a coordinated manner by the macro cells, changing the beam's direction on a 10 ms basis. This would increase the probability of correct detection by small cells located at the cell edges or coverage holes, which is also enhanced by the fact that no interference from other cells would be suffered at the proposed resource elements.

The invention also proposes a simple two-stage synchronization procedure that takes advantage of the design properties of the proposed beacon. Any other suitable detection scheme would also be valid for the purpose of this invention.

A person skilled in the art could introduce changes and modifications in the embodiments described without departing from the scope of the invention as it is defined in the attached claims.

ACRONYMS

3G Third Generation
3GPP Third Generation Partnership Project
ABS Almost Blank Subframe
BPSK Binary Phase Shift Keying
CoMP Cooperative Multi-Point
DFT Discrete Fourier Transform
DSL Digital Subscriber Line
eICIC Enhanced Inter Cell Interference Coordination
eNB Enhanced Node B
FDD Frequency Division Duplex
FFT Fast Fourier Transform
GPS Global Positioning System
GSM Global System for Mobile Communications
HetNet Heterogeneous Network
ICI Inter Carrier Interference
IEEE Institute for Electrical and Electronics Engineering
IMT International Mobile Telecommunications
ISI Inter Symbol Interference
LTE Long Term Evolution
LTE-A Long Term Evolution-Advanced
ML Maximum Likelihood
NTP Network Time Protocol
OAM Operation And Maintenance
OFDM Orthogonal Frequency Division Multiplexing
PDH Plesiochronous Digital Hierarchy
PSS Primary Synchronization Signal
RB Resource Block
RE Resource Element
RX Reception
SDH Synchronous Digital Hierarchy
SFN Single Frequency Network
SINR Signal to Interference and Noise Ratio
SNR Signal to Noise Ratio
SSS Secondary Synchronization Signal
SyncE Synchronous Ethernet
TDM Time Division Multiplexing
TX Transmission
UE User Equipment
UMTS Universal Mobile Telecommunication System
UTC Coordinated Universal Time

REFERENCES

[1] 3GPP TS 36.300, Evolved Universal Terrestrial Radio Access (E-UTRA) and Evolved Universal Terrestrial Radio Access Network (E-UTRAN); Overall Description, Stage 2 (Release 8)
[2] 3GPP TS 36.104, Universal Terrestrial Radio Access (E-UTRA); Base Station (BS) radio transmission and reception (Release 9)
[3] 3GPP TR 36.819, Coordinated multi-point operation for LTE physical layer aspects (Release 11)
[4] S. Sesia, I. Toufik, M. Baker (editors), "LTE, the UMTS Long Term Evolution: From Theory to Practice—second edition", John Wiley & Sons, 2011
[5] 3GPP TS 36.211, Evolved Universal Terrestrial Radio Access (E-UTRA), Physical channels and modulation (Release 10)
[6] W. Henkel, G. Taubök, P. Ödling, P. O. Börjesson, N. Petersson, "The Cyclic Prefix of OFDM/DMT—An Analysis", Ericsson Telecom AB. Appeared on 2002 International Zurich Seminar on Broadband Communications, Zurich, Switzerland.
[7] A. Magee, "Synchronization in Next-Generation Mobile Backhaul Networks", IEEE Communications Magazine, October 2010
[8] "LTE-Advanced: Heterogeneous Networks", Qualcomm Incorporated, January 2011
[9] 3GPP TS 36.101, Evolved Universal Terrestrial Radio Access (E-UTRA), User Equipment (UE) Radio Transmission and Reception (Release 10).

The invention claimed is:

1. A method for providing phase synchronization to non-phase synchronized cellular base stations, comprising at least one phase synchronized cellular base station having at least one transmit antenna for transmitting a signal to a at least one non-phase synchronized cellular base station, the method comprising:
transmitting by said at least one transmit antenna of said phased-synchronized cellular base station a beacon signal to said at least one non-phase synchronized cellular base station, included as part of said transmitted signal, said beacon signal comprising two orthogonal length-8 Walsh-Hadamard sequences to be broadcasted by said at least one phase synchronized cellular base station in order to provide said phase synchronization; and
mapping said two orthogonal length-8 Walsh-Hadamard sequences of said beacon signal on unused Resource Elements at the slots symbols where Primary and Secondary Synchronization Signals are transmitted, said unused Resource Elements being reserved for transmission of any other signals thus having no interference from other cells in time-synchronized networks.

2. A method according to claim 1, characterized in that it comprises transmitting said beacon signal periodically every 10 milliseconds (ms).

3. A method according to claim 2, characterized in that it comprises mapping said orthogonal length-8 Walsh-Hadamard sequences on said unused Resource Elements for a Type 1 frame structure by using the following expressions:

$$\text{sequence 1} \begin{cases} \text{1st half on slot 0, } l = N_{sym}^{DL} - 2, m = -n - 31 + \frac{N_{RB}^{DL} N_{sc}^{RB}}{2} \\ \text{2nd half on slot 0, } l = N_{sym}^{DL} - 1, m = -n - 31 + \frac{N_{RB}^{DL} N_{sc}^{RB}}{2} \end{cases}$$

$$\text{sequence 2} \begin{cases} \text{1st half on slot 0, } l = N_{sym}^{DL} - 2, m = n + 31 + \frac{N_{RB}^{DL} N_{sc}^{RB}}{2} \\ \text{2nd half on slot 0, } l = N_{sym}^{DL} - 1, m = n + 31 + \frac{N_{RB}^{DL} N_{sc}^{RB}}{2} \end{cases}$$

where l is the symbol number and m the resource element number, $N_{sym}^{DL}$ denotes the number of symbols in each slot, $N_{RB}^{DL}$ is the system bandwidth expressed as a number of resource blocks, $N_{sc}^{RB}$ is the number of subcarriers in each resource block, and n can take the values 2, 3, 4 and 5.

4. A method according to claim 2, characterized in that it comprises mapping said orthogonal length-8 Walsh-Hadamard sequences on said unused Resource Elements for a Type 2 frame structure by using the following expressions:

$$\text{sequence 1} \begin{cases} \text{1st half on slot 1, } l = N_{sym}^{DL} - 1, m = -n - 31 + \frac{N_{RB}^{DL} N_{sc}^{RB}}{2} \\ \text{2nd half on slot 2, } l = N_{sym}^{DL} 2, m = -n - 31 + \frac{N_{RB}^{DL} N_{sc}^{RB}}{2} \end{cases}$$

$$\text{sequence 2} \begin{cases} \text{1st half on slot 1, } l = N_{sym}^{DL} - 1, m = n + 31 + \frac{N_{RB}^{DL} N_{sc}^{RB}}{2} \\ \text{2nd half on slot 2, } l = 2, m = n + 31 + \frac{N_{RB}^{DL} N_{sc}^{RB}}{2} \end{cases}$$

where l is the symbol number and m the resource element number, $N_{sym}^{DL}$ denotes the number of symbols in each slot, $N_{RB}^{DL}$ the system bandwidth expressed as a number of resource blocks, $N_{sc}^{RB}$ is the number of subcarriers in each resource block, and n can take the values 2, 3, 4 and 5.

5. A method according to claim 1, characterized in that it comprises modulating said beacon signal by a Binary phase-shift keying (BPSK) modulation.

6. A method according to claim 1, characterized in that it comprises having said at least one phase synchronized cellular base station a plurality of said transmit antennas, and applying a synchronized beacon beamforming over said unused Resource Elements.

7. A method according to claim 6, characterized in that it comprises applying phase shifts and amplitudes on the signals feeding said plurality of transmit antennas.

8. A method according to claim 6, characterized in that it comprises transmitting said beacon signal on the same antenna ports of said plurality of transmit antennas used for said Primary and Secondary Synchronization Signals.

9. A method according to claim 1, characterized in that each of said at least one phase synchronized cellular base station is one of a macro cell base station or a small cell base station.

10. A method according to claim 1, characterized in that each of said at least one non-phase synchronized cellular base station is a small cell base station.

\* \* \* \* \*